US011705854B2

(12) United States Patent
Keren et al.

(10) Patent No.: US 11,705,854 B2
(45) Date of Patent: Jul. 18, 2023

(54) ANCHORING STRUCTURE FOR GROUND MOUNTING OF SOLAR PHOTOVOLTAIC SYSTEM

(71) Applicant: SOLATICS LTD., Beit Elazary (IL)

(72) Inventors: Benjamin Keren, Yuvalim (IL); Neta Reef, Beit Elazary (IL)

(73) Assignee: SOLATICS LTD., Beit Elazary (IL)

( * ) Notice: Subject to any disclaimer, the term of this patent is extended or adjusted under 35 U.S.C. 154(b) by 214 days.

(21) Appl. No.: 16/630,671

(22) PCT Filed: Jun. 2, 2018

(86) PCT No.: PCT/IL2018/050597
§ 371 (c)(1),
(2) Date: Jan. 13, 2020

(87) PCT Pub. No.: WO2019/012518
PCT Pub. Date: Jan. 17, 2019

(65) Prior Publication Data
US 2021/0091708 A1    Mar. 25, 2021

(30) Foreign Application Priority Data
Jul. 18, 2017    (IL) .......................................... 253535

(51) Int. Cl.
*H02S 20/10*    (2014.01)
*H02S 30/10*    (2014.01)
(Continued)

(52) U.S. Cl.
CPC .............. *H02S 20/10* (2014.12); *F16B 5/123* (2013.01); *F24S 25/50* (2018.05); *H02S 30/10* (2014.12)

(58) Field of Classification Search
CPC .......... F24S 25/61; F24S 25/617; F24S 25/67; F24S 25/50; F16B 5/123; H02S 20/10; H02S 30/10
See application file for complete search history.

(56) References Cited

U.S. PATENT DOCUMENTS 3,512,319 A * 5/1970 Piacentino .............. E02D 5/803
52/160
4,044,513 A * 8/1977 Deike ..................... E02D 5/803
405/259.5
(Continued)

FOREIGN PATENT DOCUMENTS

DE    10 2011 016 697 B3    7/2012
JP       2013-130011 A      7/2013

OTHER PUBLICATIONS

Summary of the Preliminary Search conducted before Israeli Patent Application No. 253535 was filed.
S. Jianxia, "Hydro Power" 2012, pp. 1-11.

*Primary Examiner* — Patrick D Hawn
(74) *Attorney, Agent, or Firm* — Stein IP, LLC (57) ABSTRACT

The present invention discloses a ground mounting system, particularly for mounting solar photovoltaic panels on a planar or inclined surface or a surface that is partly planar and partly inclined The disclosed invention is a system that comprised of an array of soil nails, inserted in the ground; a plurality of adapting apparatus, each on top of each the nails; and a resulting structure supports racks, made of metal or plastic, or other structural profiles designed to enable mounting photovoltaic panels on it, wherein the racks are installed on the array of nail using the adapting apparatus.

16 Claims, 6 Drawing Sheets

(51) Int. Cl.
*F24S 25/50* (2018.01)
*F16B 5/12* (2006.01)

(56) References Cited

U.S. PATENT DOCUMENTS

| | | | | |
|---|---|---|---|---|
| 5,951,202 | A * | 9/1999 | Brown | E02B 3/122 |
| | | | | 405/19 |
| 7,789,594 | B2 * | 9/2010 | Stahm | E02D 17/20 |
| | | | | 405/302.4 |
| 7,862,259 | B2 * | 1/2011 | Carpenter | E03F 5/041 |
| | | | | 405/302.7 |
| 8,468,755 | B2 * | 6/2013 | Zuritis | H02S 20/24 |
| | | | | 52/173.3 |
| 8,544,221 | B2 * | 10/2013 | Marley | H02S 20/10 |
| | | | | 52/173.3 |
| 8,622,654 | B2 * | 1/2014 | Oliveira | E02D 17/202 |
| | | | | 405/129.75 |
| 8,651,771 | B2 * | 2/2014 | Schneider | E02D 5/80 |
| | | | | 405/302.7 |
| 9,611,609 | B2 * | 4/2017 | Kelleher | F24S 25/617 |
| 10,077,893 | B1 * | 9/2018 | Abraham | E04H 12/2253 |
| 10,992,250 | B2 * | 4/2021 | Ayers | F24S 25/13 |
| 2002/0094238 | A1 * | 7/2002 | Schibi | E02B 5/02 |
| | | | | 405/118 |
| 2009/0175687 | A1 * | 7/2009 | Oliveira | E02D 17/202 |
| | | | | 405/53 |
| 2010/0139649 | A1 * | 6/2010 | Almy | F24S 25/12 |
| | | | | 126/704 |
| 2010/0319272 | A1 * | 12/2010 | Kellner | F24S 25/617 |
| | | | | 52/157 |
| 2011/0121144 | A1 * | 5/2011 | Berbegal Pastor | H02S 20/32 |
| | | | | 248/185.1 |
| 2011/0163051 | A1 * | 7/2011 | Horanek | F24S 25/13 |
| | | | | 211/26 |
| 2012/0031468 | A1 * | 2/2012 | Boise | F24S 23/70 |
| | | | | 136/248 |
| 2012/0152316 | A1 * | 6/2012 | Fischer | F24S 25/617 |
| | | | | 136/246 |
| 2013/0232757 | A1 * | 9/2013 | Ramos | F24S 25/33 |
| | | | | 29/428 |
| 2014/0190556 | A1 * | 7/2014 | Conger | E02B 1/00 |
| | | | | 136/251 |
| 2015/0292228 | A1 * | 10/2015 | Bardelli | E04H 12/2269 |
| | | | | 52/165 |
| 2016/0186403 | A1 * | 6/2016 | Tomchesson | E02D 5/526 |
| | | | | 405/244 |
| 2018/0367093 | A1 * | 12/2018 | Ayers | H02S 30/10 |
| 2020/0032831 | A1 * | 1/2020 | Almy | F16B 25/106 |
| 2021/0013826 | A1 * | 1/2021 | Ayers | H02S 30/10 |
| 2021/0091708 | A1 * | 3/2021 | Keren | H02S 30/10 |
| 2021/0115642 | A1 * | 4/2021 | Almy | E02D 13/04 |

\* cited by examiner

ANCHORING STRUCTURE FOR GROUND MOUNTING OF SOLAR PHOTOVOLTAIC SYSTEM

CROSS-REFERENCE TO RELATED APPLICATIONS

This is a national stage application which claims the benefit of International Patent Application No. PCT/IL2018/050597, filed Jun. 2, 2018, in the International Patent Office, which claims the benefit of priority to Israeli Patent Application No. 253535 filed Jul. 18, 2017, the disclosures of which are incorporated herein in their entireties by reference.

BACKGROUND OF THE INVENTION

One of the most crucial, difficult, time-consuming and expensive tasks of building ground mount utility scale solar arrays, is anchoring the system to the ground so it will not move, sink or brake during high winds, rain, snow events and seasonal change of the ground. Even more difficult challenge is how to anchor these systems in places with Expansive Soils, of high shrink-swell capacity factor, soils which tend to move, shrink or swell. In such occasions very heavy and expensive anchoring foundations are required.

The present invention provides a novel technology for anchoring solar photovoltaic structures on sloped or flat grounds. The anchoring structure comprise of only three components, cost effective to make and simple and fast to install. The anchoring system is also lightweight and semi-flexible. Finally, this solution is highly robust, easy to maintain and to fix in case need.

Relevant Applications of our invention, involve assembly of solar systems on the outer side slopes of water reservoir banks, landfills, sloped ground at sides of highway roads, railway lines, embankments, berms and such other man made ground structures.

SUMMARY OF THE INVENTION

The present invention is an anchoring system and a direct mounting method for solar photovoltaic system based on combining three prevailing building technologies: earth anchoring using soil nails (also known as ground nails or earth anchors), an exposed geomembrane liner and a structural tie-up racks.

The system's three main components are: soil nails with interconnection joint, geomembrane liner which cover the ground and tie-up racks. A typical usage of the innovation, involve soil nails that are being inserted through a geomembrane layer and are then tied to each other by bolts on nails' top edge. The resulting structure supports racks made of metal or plastic or other structural profiles to which photovoltaic panels can be mounted.

The invention is suitable for most soil type including Expansive Soils. Preferred soil type is filling soft soil which is used typically in banks of water reservoir, landfill or roads side banks and embankments.

Anchoring structure components: our system comprise of three main components, working together to enhance anchoring effect and robustness:

(1) Soil nail are intended to enable direct mounting of PV panels to the below ground or other surface. Nails may be of any shape (rod, threaded rod etc.), size or material (metal, plastic, etc.). Soil nails should be able to withstand loads on panels such as snow load compression and wind uplift forces. It should be able to serve as base structure for PV panels for at least 25 years. Soil nails also enhance soil stability during service. Preferred ground is soil without large stones or rocks. Nail diameter: 5-30 mm, length 0.5 to 20 meter and can be made, for example, of construction steel coated with protective layer of plastic or Zink or any such other material that is strong enough to be inserted to the necessary depth m the ground. Spacing between soil nails depend on the nail design, soil parameters, local building standards for uplift forces, solar field parameters (i.e., slope level, direction, size and shape) and photovoltaic system being installed on the grounding structure. Typical spacing may be 1-6 meters between each two nails. Typical soil nails: are intended to support heavy loads and are expensive and demand special tooling to insert. Our system allow the use of very simple soil nail design, which is easy to insert in 1 minute and at a cost of single digit dollar amount.

(2) Geomembrane: layer is placed to cover the ground beneath the photovoltaics system. The above mentioned soil nails are inserted through the geomembrane layer and hold it in place. Suitable materials as geomembrane layer are (not a closed list). HDPE, LDPE, LLDPE, HDPP, TPO, Reinforced PVC and such other long standing membrane materials Thickness range (but not limited to) 0.5 to 3 mm. The geomembrane layer covering the ground is aimed to eliminate rain and wind damage to the sloped ground and the soil nails attachment to the ground while also providing additional structural strength to the soil nails, since the geomembrane distribute the forces being put on the soil nails in a very efficient way. This is especially important on sloped grounds. Geomembrane layer also eliminate weeds from growing underneath the solar array. Weeds grows may harm the solar field and its maintenance in addition to changing the soil structure and weakening the soil nail attachment to the ground.

(3) Tie-up racks: function as a base to anchor panels and by regulation to maintain the panels at same surface made of metal or plastic or other structural materials in the shape of strips or profiles. The tie-up racks are designed to provide the soil nail extra strength against up-lift wind forces. This is extremely important when used in shallow insertion of soil nail into sloped grounds. Previous mounting solutions depend on single soil nail being able to withstand up-lift forces when stand alone. The uniqueness of current invention relay on the high impact force being created by multiple soil nails working together.

Assembly of PV System

The photovoltaic array is being assembled directly on top of the soil nails using racking profiles (metals or plastic) which are secured by bolts. The photovoltaic modules are assembled to these racks by means of bolts or other fastening means. Height of panel bottom above ground may be 5-50 cm.

Typical System Assembly Procedure

Stage 1—Clear the ground surface from any plants, weeds, stones etc.

Stage 2—Placing the geomembrane sheets on the ground and secure the membrane to the ground.

Stage 3—insertion of soil nail through the geomembrane and into the below ground. Insertion can be done manually or by using electric hammer Stage 4—attach tie-up racks to soil nails' upper side using bolts (adjust location and height)

Stage 5—Assemble photovoltaic panels to tie-up racks using bolts and fasteners

Advantages

Our novel anchoring system allow to install photovoltaic arrays in places that are very difficult or not affordable to install—water reservoirs, landfills, side of highways and so on.

Using anchoring system based on soil nails is very cost effective, highly robust, simple to build and maintain and fast to deploy and install.

Most of the parts can be produced locally, therefore saving both money and lead time in procuring all necessary parts.

The geomembrane is a very simple solution, and beside reinforcing the soil nails is also allow to prevent weed growing, rain, snow and wind damages—all of which are typical to man-made soil based structures like reservoirs and landfills.

The solution is very robust, allow to use many types of solar panels and off-the-shelf parts. Our solution also solve some of the biggest challenges of anchoring photovoltaic arrays on expansive soils like clay and other soil types.

DETAILED DESCRIPTION OF THE DRAWINGS

FIG. 6 illustrates the final assembly of the solar panels (160) on racks (150) and regulated by number of regulating apparatus (160) as described in FIG. 4.

Figure 1:
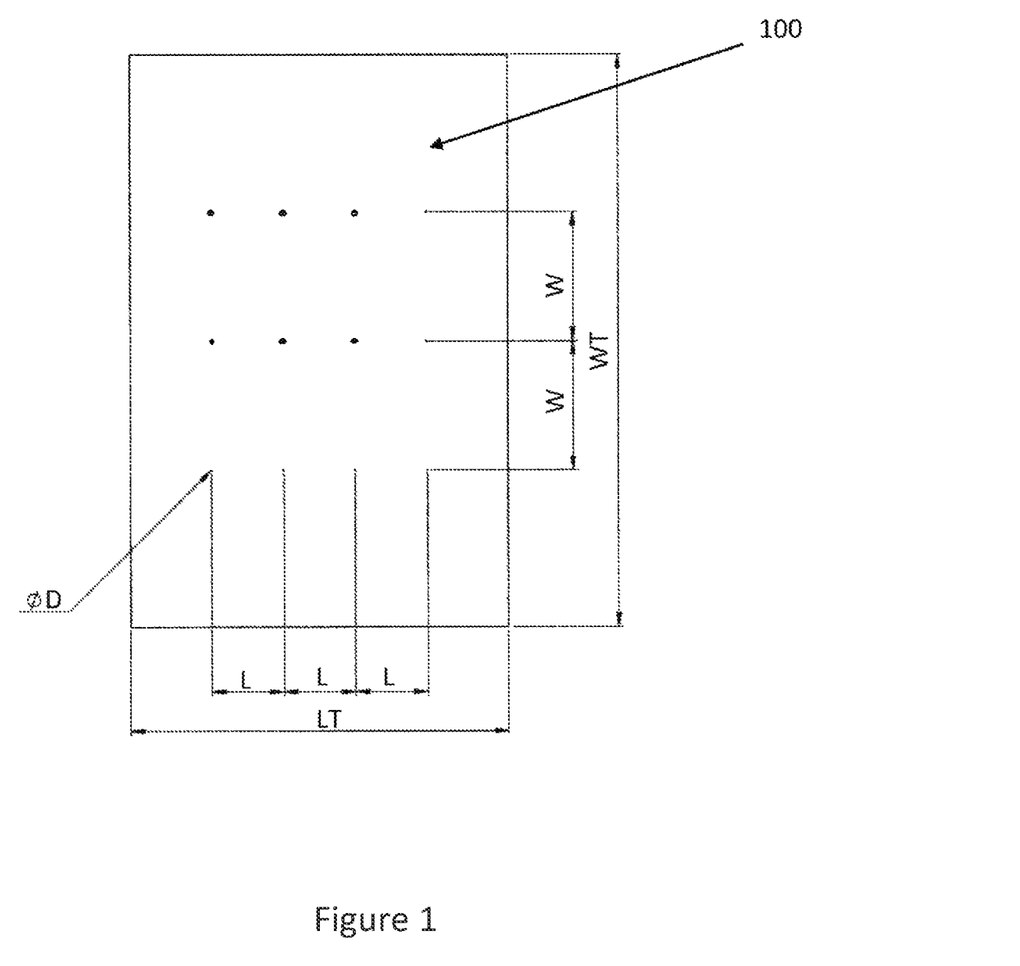
FIG. 1 illustrates typical geomembrane (100), including holes (not shown) in a predesign location.
Figure 2:
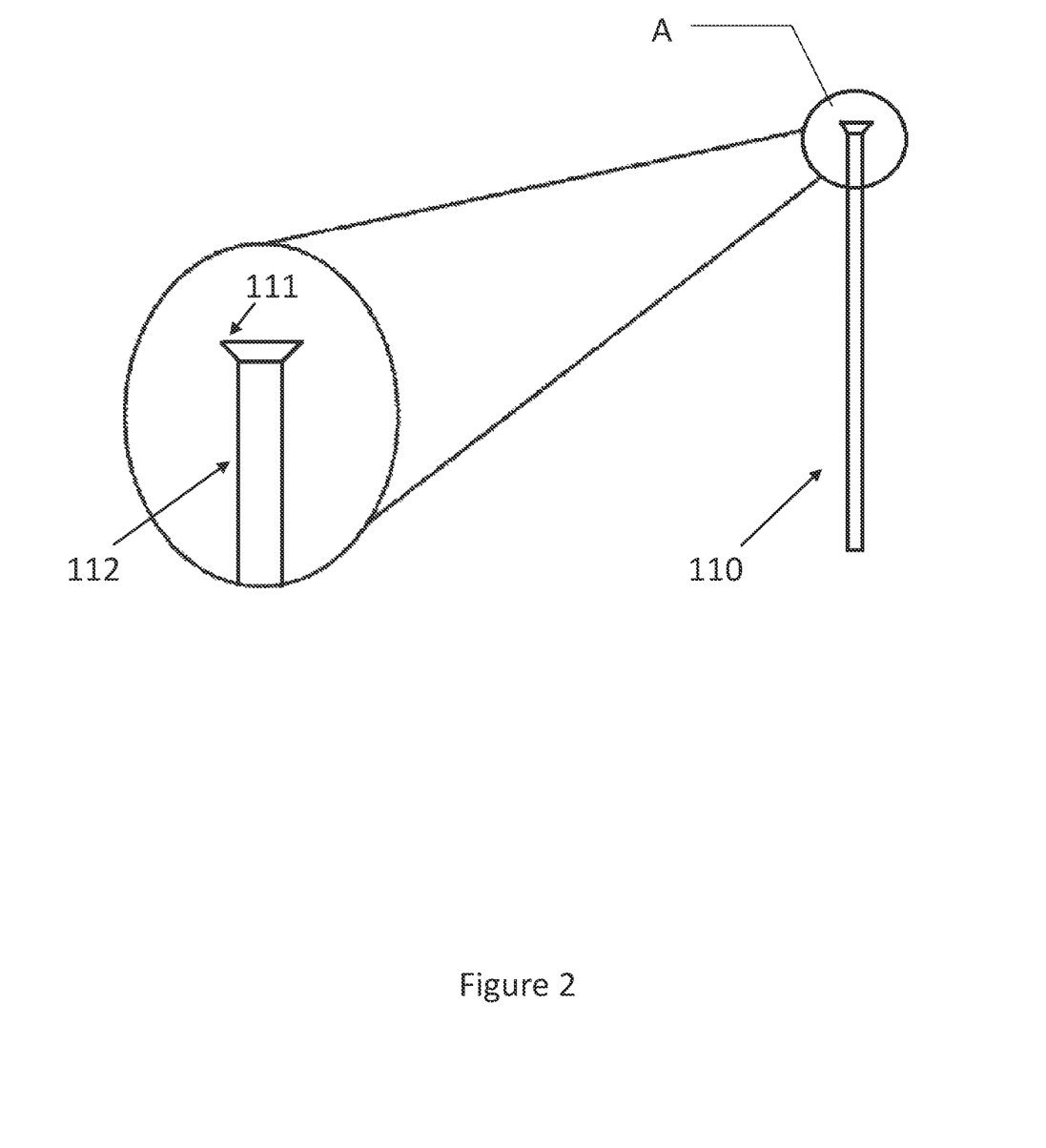
FIG. 2 illustrates a soil nail design (110), comprised of a rigid rod (112) and a flat head (11).
Figure 3:
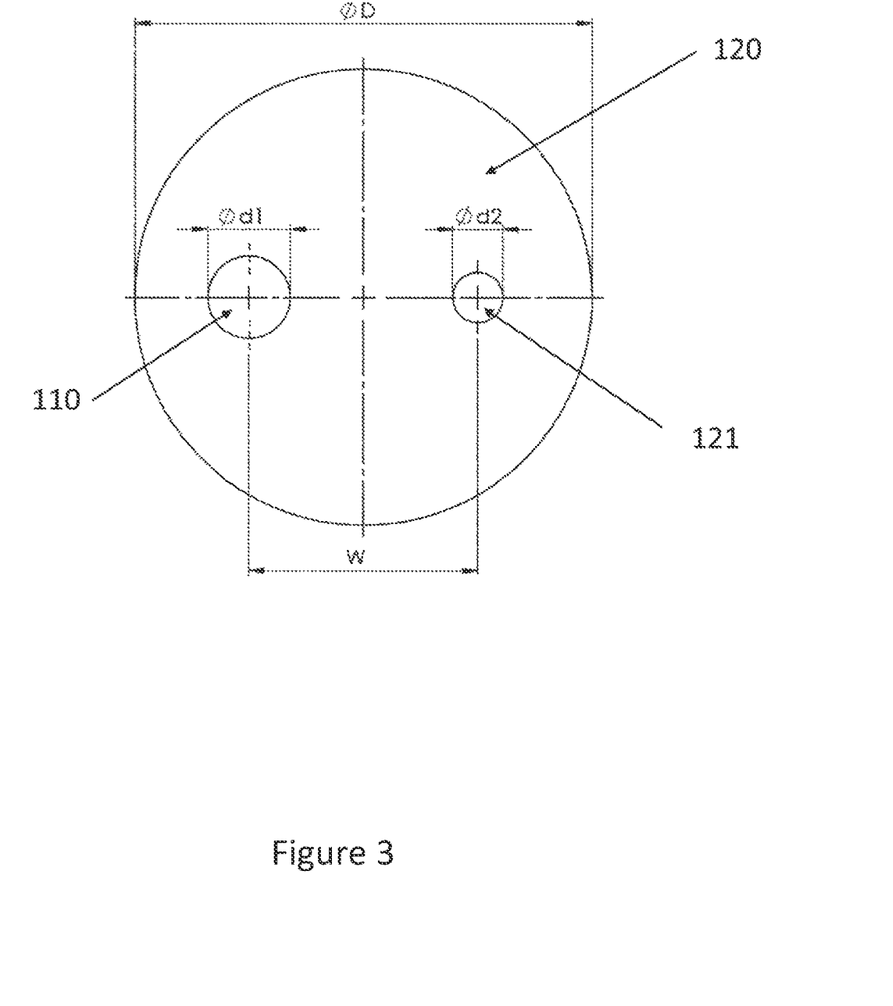
FIG. 3 illustrates a washer (120) that is a connecting disc includes one hole (110) for insertion of soil nail and another hole (121) to assemble a bolt to attach rack on which panels are assembled.
Figure 4:
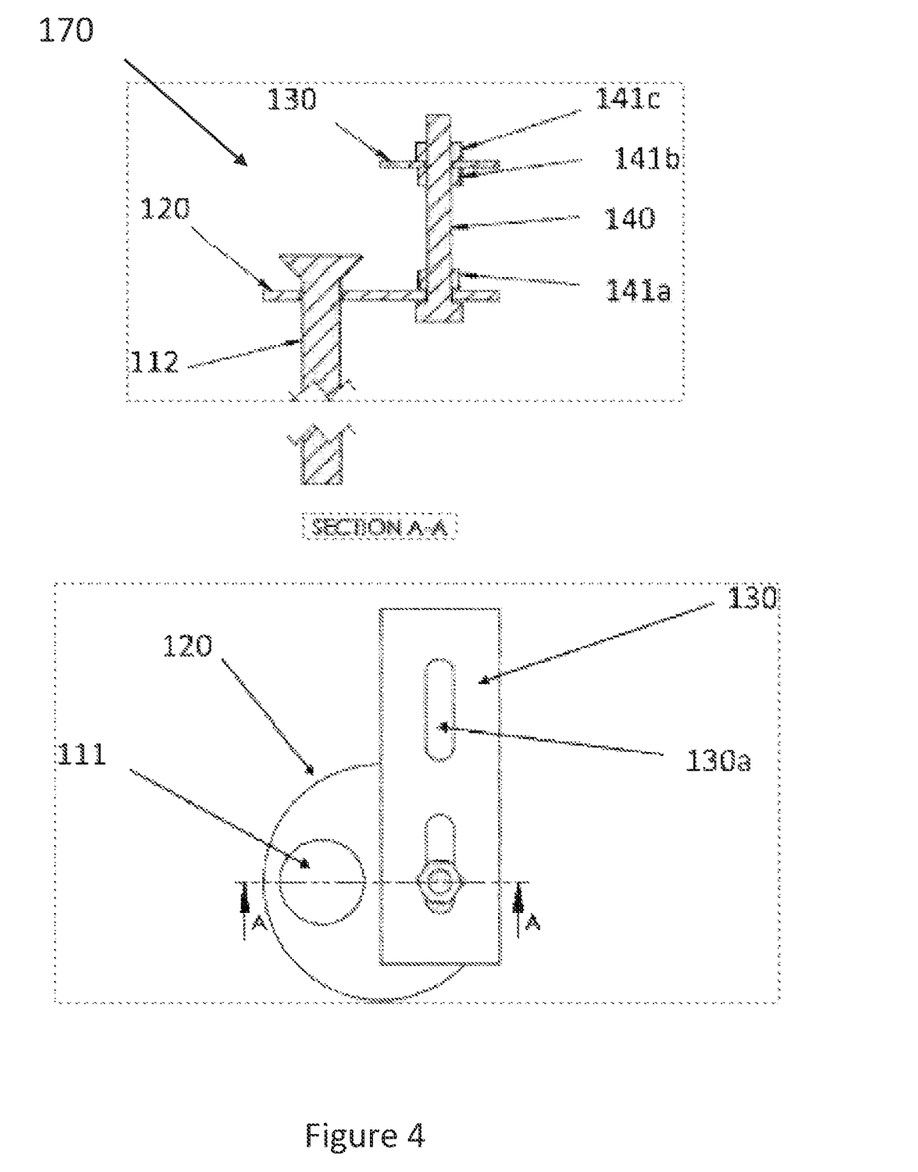
FIG. 4 illustrates a regulation apparatus (170) that is assembly of the washer (connecting disk) (120) and a connecting arm (130) that has a notched hole (130 a) and its cross section in which a bolt (140) is fastened with row nuts (141 a, b and c) and the connecting arm (130) is assembled on the bolt (140) with two nuts (141 b, 141c) enable to regulate height of the connecting arm (130).
Figure 5:
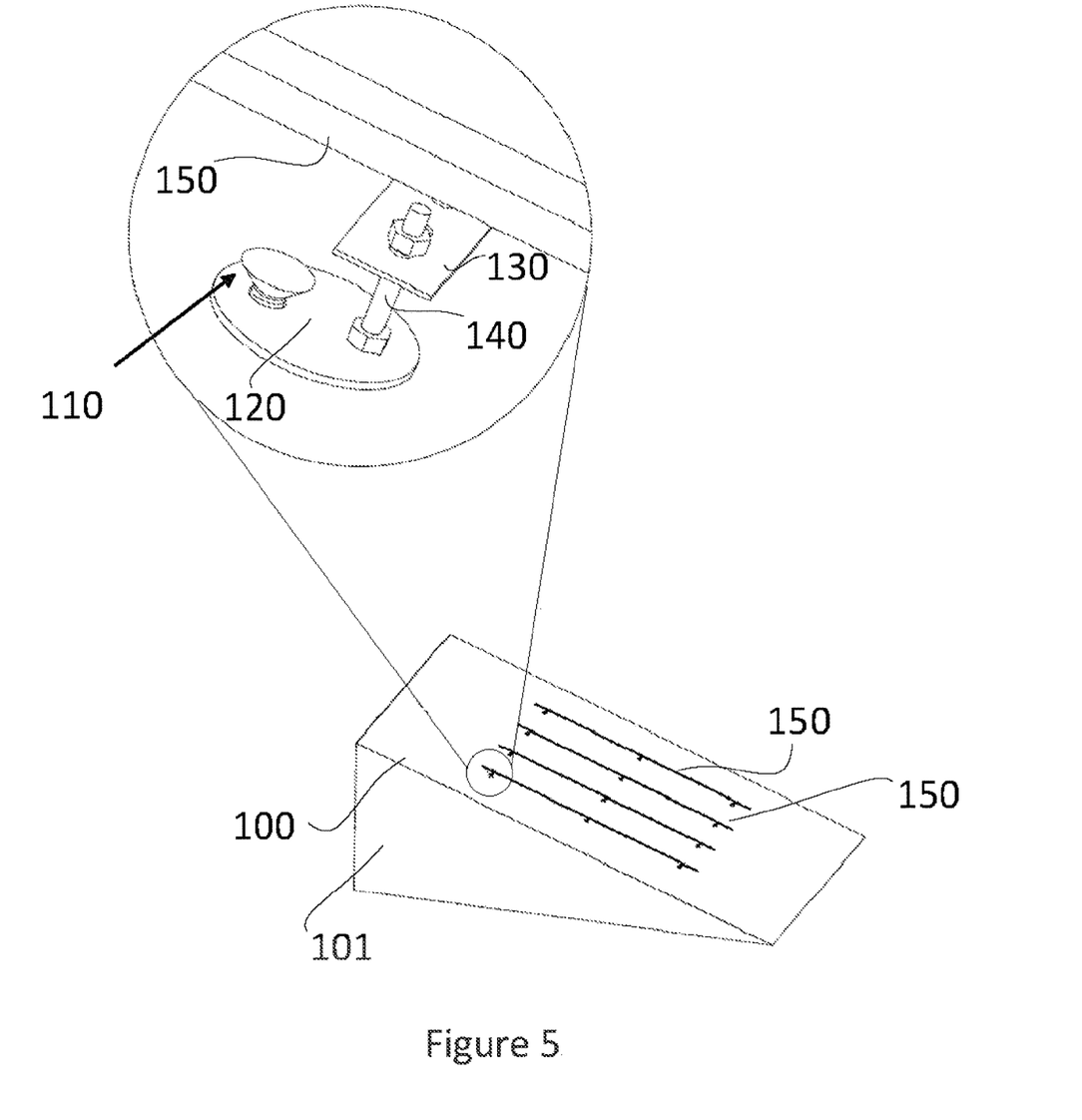
FIG. 5 illustrates a rack (150) that is assembled with a standards fastener to a number of regulation apparatus along the geomembrane (100) mat is laid on the ground (101). In each connection point there is a washer (120) connected to a soil nail (110) with a bolt (140) and flat steel (130), enabling to regulate the racks (150).
Figure 6:
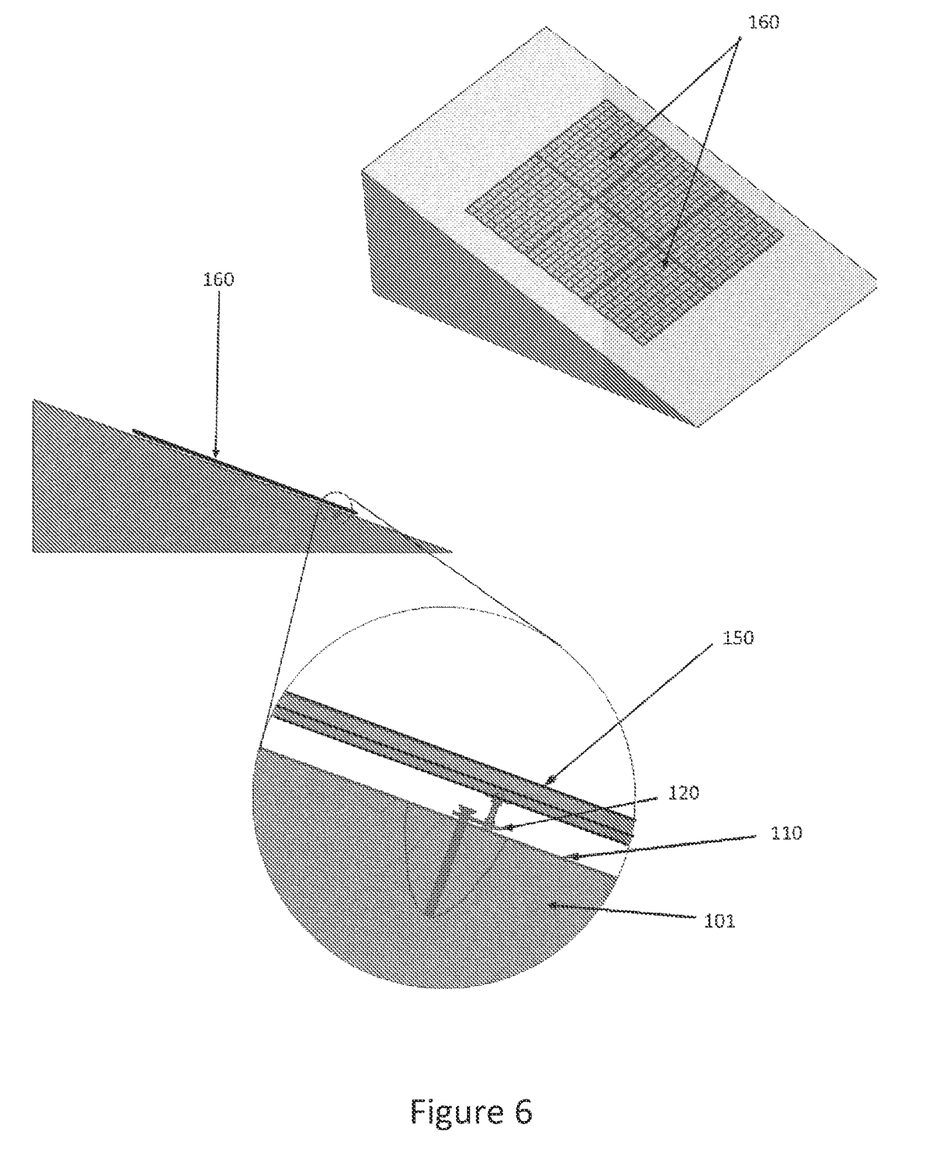
FIG. 6 illustrates the final assembly of the solar panels (160) on racks (150) and regulated by number of regulating apparatus (170) as described in FIG. 4.

The invention claimed is:

1. A utility-scale ground mounting system for mounting solar photovoltaic panels on sloped expansive soil, the system comprising:
   (a) a geomembrane, opaque to light, for covering said sloped expansive soil;
   (b) an array of finless soil nails, wherein each one of said soil nails comprising a rigid rod and are inserted through the geomembrane;
   a plurality of regulating apparatuses, positioned respectively on top of said array of soil nails; and
   (d) a plurality of supporting racks, respectively coupled with said array of soil nails via said plurality of regulating apparatuses, configured for mounting said solar photovoltaic panels,
   wherein the mounted panels have bottoms 5-50 cm away from the geomembrane, and
   wherein each soil nail in said array of soil nails has a diameter ranging between 5 mm to 30 mm, and
   wherein said geomembrane has a thickness ranging from 0.5 mm to 3 mm.

2. The ground mounting system according to claim 1, wherein said geomembrane comprises an array of holes for inserting said array of nails there through into said sloped surface.

3. The ground mounting system of claim 1, wherein said geomembrane is made from a material selected from the list consisting of:
   HDPE;
   LDPE;
   LLDPE:
   HDPP;
   TPO; and
   reinforced PVC.

4. The ground mounting system according to claim 2, wherein two adjacent ones of said array of holes are spaced between 1 to 6 meters apart.

5. The ground mounting system according to claim 1, wherein said rigid rod has a shape selected from the list consisting of:
   a rod; and
   a threaded rod.

6. The ground mounting system according to claim 1, wherein each soil
   nail in said array of soil nails has a length ranging between 0.5 meters to 2 meters.

7. The ground mounting system according to claim 1, wherein said array
   of soil nails is made from a material selected from the list consisting of:
   metal;
   plastic;
   construction steel;
   construction steel coated with a layer of plastic;
   construction steel coated with a layer of zinc; and
   construction steel coated with a corrosion-resistant layer.

8. The ground mounting system according to claim 1, wherein each one
   of said plurality of regulating apparatuses comprises at least two holes, a first hole for the insertion of one of said array of soil nails and a second hole for the insertion of a bolt for coupling with one of said plurality of supporting racks.

9. The ground mounting system according to claim 8, wherein said bolt
   is used for adjusting a height of each one of said plurality of supporting racks.

10. The ground mounting system according to claim 1, wherein said
    plurality of supporting racks is made from a material selected from the list consisting of:
    metal; and
    plastic.

11. The ground mounting system according to claim 1, wherein said
    sloped expansive soil is selected from the list consisting of:
    a bank of a water reservoir;
    a landfill;
    a side of a highway;
    a side of a railway line;
    an embankment;
    a berm;
    a man-made ground structure;
    a clay surface; and
    a coal combustion residuals landfill.

12. The ground mounting system according to claim 1, wherein each soil nail in said array of soil nails has a length of at least 1 meter and is inserted at least 1 meter into said expansive soil.

13. A method for mounting utility-scale solar photovoltaic panels on a sloped expansive soil, the method comprising the procedures of:

(i) laying a geomembrane, opaque to light, on said sloped expansive soil;

(ii) inserting a plurality of finless soil nails through said geomembrane into said sloped surface;

(iii) attaching a respective plurality of regulating apparatuses to said plurality of soil nails;

(iv) attaching a plurality of supporting racks to said plurality of soil nails via said respective plurality of regulating apparatuses; and (v) mounting said solar photovoltaic panels to said plurality of supporting racks at a distance 5-50 cm away from the geomembrane, wherein each soil nail in said array of soil nails has a diameter ranging between 5 mm to 30 mm.

14. The method according to claim 13, further comprising the procedure of creating a plurality of holes in said geomembrane at predefined locations and inserting said plurality of soil nails through said plurality of holes into said sloped surface.

15. The method according to claim 13, wherein said plurality of soil nails have at least one of a predefined shape, diameter, texture and length which correspond to at least one soil parameter of said sloped surface, said at least one soil parameter being selected from friction, permeability, operating depth and stability factor.

16. The method of claim 13, wherein each soil nail in said array of soil nails has a length of at least 1 meter and is insertable at least 1 meter into said expansive soil.

\* \* \* \* \*